Oct. 24, 1972   V. E. HAMPEL ET AL   3,700,554
SPACE REACTOR GROUND SAFETY AND CONTROL SYSTEM
Filed June 20, 1968   3 Sheets-Sheet 1

Fig. 1.a.

INVENTORS
VIKTOR E. HAMPEL
JOSEPH DAY LEE III
CARL E. WALTER
BY
ATTORNEY

Oct. 24, 1972    V. E. HAMPEL ET AL    3,700,554
SPACE REACTOR GROUND SAFETY AND CONTROL SYSTEM
Filed June 20, 1968    3 Sheets-Sheet 3

INVENTORS
VIKTOR E. HAMPEL
JOSEPH DAY LEE III
CARL E. WALTER
BY
ATTORNEY

United States Patent Office 3,700,554
Patented Oct. 24, 1972

3,700,554
SPACE REACTOR GROUND SAFETY
AND CONTROL SYSTEM
Viktor E. Hampel, Livermore, Joseph D. Lee, III, Fremont, and Carl E. Walter, Pleasanton, Calif., assignors to the United States of America as represented by the United States Atomic Energy Commission
Filed June 20, 1968, Ser. No. 738,680
Int. Cl. G21c 7/22
U.S. Cl. 176—86 M
6 Claims

ABSTRACT OF THE DISCLOSURE

A reactivity control system for fast nuclear reactors using liquid metal coolant having high and low neutron-absorption cross section components, which maintains the high neutron-absorption cross section components in solidified form in the coolant channels throughout the reactor core prior to start-up for ground safety, and which liquefies and mixes the high neutron absorption component with a low neutron-absorption cross section component, to adjust the reactor reactivity to the desired operating level. Reactivity is subsequently grossly adjusted by adding to or replacing a portion of the coolant mixture with additional quantities of one or the other appropriate component.

BACKGROUND OF THE INVENTION

The invention evolved in the course of, or under, Contract W-7405-ENG-48 with the United States Atomic Energy Commission.

FIELD OF THE INVENTION

The invention relates to a method and a means for providing a small, high temperature, "fast" nuclear reactor system, designed for use in space, with necessary negative reactivity reserves for pre-flight ground safety prior to system start-up. The invention further provides reliable, redundant operational control of small, "fast" nuclear reactor systems by adjusting the overall absorption cross section of the coolant by controlling the relative concentration of high and low neutron-absorption cross section coolant components.

PRIOR ART

Fast nuclear reactors such as are used for space power systems are essentially a subcritical fissile fuel core raised to criticality by neutron reflective barriers surrounding the core to lessen neutron leakage therefrom. Because the reactor system is critical in a fast (high-energy) neutron spctrum, as opposed to a thermal (low-energy) neutron spectrum, it is extremely sensitive and reactive to slight variations of neutron reflection. Such small, fast systems are customarily very near criticality when unreflected. Consequently, extreme care must be taken to prevent accidental reflection of neutrons into the fissile fuel core during the fabrication and pre-flight handling of the system. In view of the inherently small pre-flight safety margin, auxiliary systems or methods to prevent accidental reactivity excursions are necessary.

The prior art approach to the problem has been to increase the negative reactivity reserve by decreasing the criticality of the fissile fuel arrangement, and at the same time to enhance the contribution of the neutron reflectors to reactivity.

The term "reactivity reserve" is used to denote the degree to which the neutron multiplication factor can be varied by manipulation of reactor components. The term "negative reactivity reserve" is used to denote system capability to reduce the multiplication factor to values less than 1.000.

For example, the reactivity can be greatly increased when the reflectors are moved into place by increasing the thickness of the reflectors. The reactivity of the fissile fuel core by itself is thus kept low by reducing the fuel content or core size, or both. Prior to start-up, the reflectors are kept separate and neutronically isolated from the fissile fuel core to sustain the system in a safe nuclear posture.

Other prior techniques along the same lines are keeping part of the fuel separate from the core, disposing a neutron absorber body in the core, or a combination of the above techniques.

The above pre-flight ground safety schemes are unsatisfactory because the possibility of accidental neutron reflection is not entirely eliminated. Also, highly unreactive fuel arrangements impose a penalty upon operational efficiency and operating life, since fractional fuel burnup and fission product poisoning are correspondingly increased and introduce additional negative reactivity during reactor operation. Furthermore, of yet greater significance for space power systems, thick reflectors increase the specific mass of the system, and cause an extremely high, narrow fission density spike near the core-reflector interface of the fueled core.

Other approaches require complex, mechanically active systems to move insert, or remove materials from or into the fissile fuel core volume, which must be sufficiently reliable to survive a rocket launch, and must be capable of reliable performance during high-temperature operation of the reactor.

Since, for operational control of such small, fast space reactor systems, only a relatively small reactivity reserve is usually required, the utility of the prior art systems is strictly limited to providing ground safety. From all other points of view, such systems are a disadvantage.

Accoringly, it is desirable in space reactor systems to increase the positive and negative reactivity reserves significantly over that which would be required for normal operation without incurring penalties in specific mass. Also, it is desirable that the operational reactivity reserve be distributed between redundant control systems to enhance the reliability of the reactor system. In addition, increasing operational and control reactivity reserve of a space reactor system, and incorporating the increased reserve into several redundant control systems, gives the system a greater operational flexibility and a longer operational lifetime.

SUMMARY OF THE INVENTION

In accordance with the present invention, the large negative reactivity reserve necessary for ground safety of a small, fast nuclear reactor system is provided by utilizing the reactor coolant and circulation system, which is an integral part of any such reactor, in a dual capacity, rather than employing auxiliary means or methods which increase specific mass and volume of the reactor, and which complicate operations. Specifically, coolant components of different nuclear properties are strategically positioned in premixed solid form in the reactor core volume and in the remainder of the circulation loop, to selectively inhibit reactivity prior to start-up and promote a favorable reactivity level thereafter.

More particularly, a high neutron-absorption cross section component, which is a solid at ambient pre-start temperatures, such as lithium-6, for example, is disposed inside the core volume to depress the reactivity of the reactor to a safe level. A low neutron-absorption cross section component, such as the lithium-7 isotope, for example, is disposed in the remainder of the circulation loop, which is miscible with the high cross section component when molten. The low cross section component may itself be a composite of low and high neutron-absorption cross section species, e.g., lithium enriched with $Li^7$. The relative quantities and cross sections of the components are such that their overall homogenous effect upon reactivity, subsequent to melting and mixing, promotes a favorable reactivity state for reactor operation. Further, the components are employed to provide functional control of the fast space reactor system, while dually functioning as the primary coolant of that reactor system.

Control of the reactivity level of the reactor system is achieved by providing reserve quantities of both components with high and low neutron capture, and by selectively feeding predetermined quantities of the appropriate components into the circulation loop to adjust the mixture ratio and the overall reactivity coefficient of the coolant.

The coolant components further afford a convenient means for compensating for the temperature reactivity effect by using the coolant as a coupling fluid, i.e., by thermally coupling the fissile fuel to the fuel cladding and to the primary coolant channels, with a coolant, composition of predetermined, variable ratio of coolant components.

Thus, the invention does not require an increase in specific reactor mass, but allows a reduction in specific mass, since the coolant system can be utilized to perform control and scram functions as well. The system can also be employed to enhance reliability by providing redundant control alternatives for space reactors. In combination with external neutron reflectors, the present control capability via the primary circulation loop significantly increases the flexibility of operation of such reactors. The present system is also very well suited for completely automated operations, in that the adjustments in the coolant compositions and flow for control of reactor reactivity levels can largely be accomplished by opening and closing the valves.

Other features of the invention will become further apparent in the following description and accompanying drawings, described in the following paragraphs.

DESCRIPTION OF THE DRAWINGS

FIGS. 1 and 1A are a before-after schematic representation of a small, fast reactor system, illustrating the inventive technique for pre-flight ground safety.

DESCRIPTION OF THE PREFERRED EMBODIMENT

Figure 1:
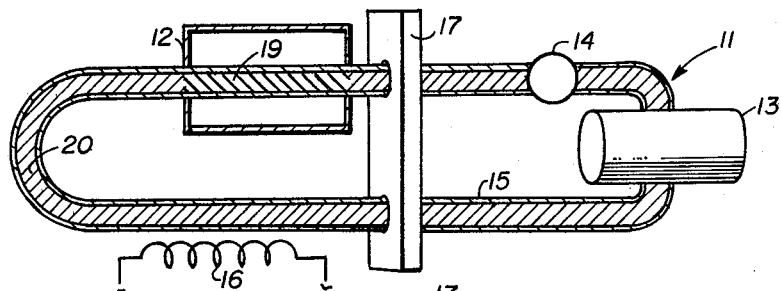
Figure 2:
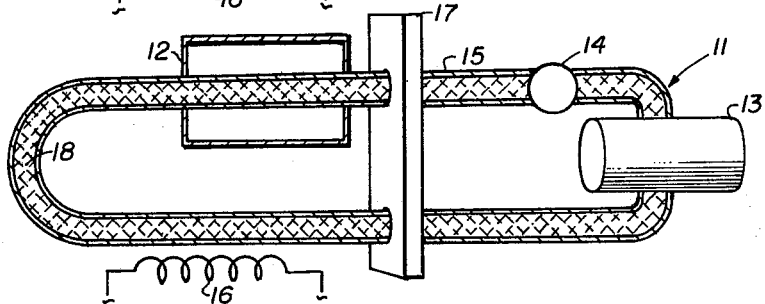
FIG. 2 is a graph showing the change in the effective neutron multiplication factor ($\Delta k_{eff}$) of an exemplary small, fast reactor system as a function of the mixture ratio of $Li^6$ and $Li^7$ isotopes in the core volume of the reactor system.
Figure 2:
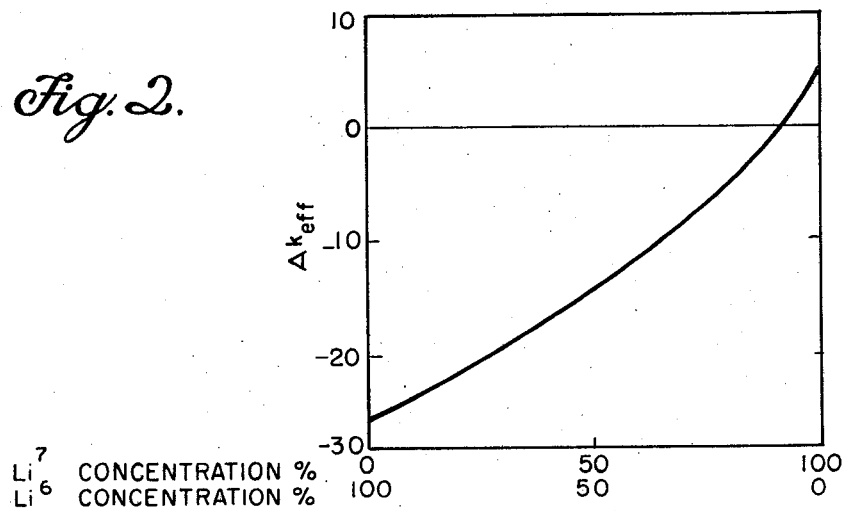

In FIGS. 1 and 1A, a small, fast reactor system 11 is schematically represented with a fissile fuel core 12, a boiler 13, and a pump 14, serially connected to a closed circulation loop 15 for transporting coolant material 18 which serves as the main heat transfer medium. Auxiliary heating means for reactor start-up and initial coolant melting are schematically depicted as a coil 16. A radiation shield 17 is disposed between the reactor core 12 and the remaining components of the system 11, i.e., the pump 14 and the boiler 13. The circulation loop 15 communicates through the shield 17, between the core 12 and the boiler 13 and pump 14. The coolant material 18 has at least two components with distinctly different nuclear properties. Specifically, one component has a high neutron-absorption cross section, while the other component has a low neutron-absorption cross section.

FIG. 1 shows the reactor system 11 in a safe ground position with the coolant material 18 as a solid in the circulation loop 15. The high neutron-absorption component 19 is frozen in the fueled-core section of the circulation loop, whereas the low neutron-absorption component 20 is frozen in the section of the loop 15 exterior to the fueled core 12. In this configuration, the reactor is substantially subcritical due to the presence of the relatively efficient absorber isotope 19 within the core region.

In FIG. 1A, the reactor system 11 is shown under operating conditions, where the coolant material 18 is in the liquid state, with the components 19 and 20 homogeneously mixed in the primary circulation loop. In this configuration, the reactor is near-critical, i.e., the effective neutron multiplication factor ($k_{eff}$) is just slightly below 1,000.

The preferred coolant or heat transfer agent of the present invention is lithium, or, more precisely, the lithium isotopes $Li^6$ and $Li^7$. The $Li^6$ isotope has a large neutron-absorption cross section over a wide range of neutron energies, and is used as component 19 in a core region. The $Li^7$ isotope has a low neutron-absorption cross section for the same energy range of neutrons, and is disposed in the remainder of the volume defined by circulation loop 15. In place of pure isotopes, suitable mixtures preferentially enriched with $Li^6$ or $Li^7$ isotopes may also be employed. The advantages of using lithium isotopes are their heat transfer capacity, complete miscibility and uniform, predictable behavior or the mixed coolant.

The reactor remains highly subcritical as long as the disopsition of the lithium isotope components, shown in FIG. 1A, is sustained. This disposition will persist and no mixing occurs as long as the components remain frozen below 179° C. Consequently, the reactor system 11 in the configuration shown in FIG. 1 is in an inherently safe nuclear posture.

In space, or at some other suitable time, the auxiliary heating system 16, which may be either a short-term chemical or an electrical heat source, liquifies the lithium coolant 18, commencing with this process near the location of the expansion tank, serving the diverse circulation loops. The coolant 18 is then circulated to irreversibly and homogenously mix the initial lithium isotope mixture 19 and 20 in the circulation loop 15, to bring the system to a near-critical state. Other reactivity control means, or further adjustments in the $Li^6$ and $Li^7$ concentration of the final homogenous mixture, are then employed to render the reactor critical.

While a lithium isotope system is preferable to any other coolant composition for the exemplary reactor of the preferred embodiment, it should be noted that other elements having two or more differentially neutron-absorbing isotopes could be employed for reactivity control as well, as will be discussed further below. To qualify the material for providing a ground safety negative reactivity reserve, a further requirement would be, of course, that the components undergo a phase change from solid to liquid above ambient temperature and below the operational temperature of the reactor system. Since the operating temperature of small, fast reactors is quite high, examples of suitable potential elements in the above categories include lithium, silver, copper, lead, potassium and barium. Isotopes of mercury, hydrogen and helium are suitable for reactor control.

In the case of coolant components which are isotopes of the same element, the mixing process is irreversible from a practical point of view. It may be desirable to separate the components again, i.e., to remove the high-absorption cross section fraction from the coolant, in order to increase reactor reactivity as in the final periods of long term missions. For example, for such applications, the coolant components, other than isoptopes of the same element, can be selected from different elements, which are then separable according to conventional chemical or physical techniques.

The design of a specific reactor and deployment of the present cooling system is subject to the following constraints:

First, the reactor itself should be subcritical when the circulation loops are completely empty to avoid excursion of reactivity in case of accidental rupture of the main circulation loop and subsequent loss of fluid.

Secondly, no reactivity excursion should take place if the circulation loop of the core volume is entirely occupied by the low neutron-absorption component 20 initially disposed outside the core region. This is done by adjusting the relative concentration of the species initially present in the component 20 so that the overall neutron-absorption cross section of component 20, when entirely disposed in the fueled core section of the circulation loop, does not raise reactivity above the delayed-critical state.

The final constraint upon the reactor design concerns the circulation loop volumes within and outside the reactor core. The desired negative reactivity coefficient of the operating mixture of the coolant components can be obtained by proper choice of the relative volumes occupied by the high and low absorptivity components.

The general principal of reactor design theory for fixing specific parameters of the fuel, coolant, reflector and other components of fast reactor systems are given in detail in the following works:

(1) "Nuclear Space Propulsion," Holmes F. Crouch, Astronuclear Press, 1968.

(2) "Physics of Fast and Intermediate Reactors," vol. 1, 2 and 3, U.S. International Atomic Energy Agency, 1962.

(3) "Control of Nuclear Reactors and Power Plants," M. A. Schlutz, McGraw-Hill Book Co., 1961.

(4) "Nuclear Reactor Control Engineering," J. M. Harrer, D. Van Nostrand Co., 1963.

Figure 5:
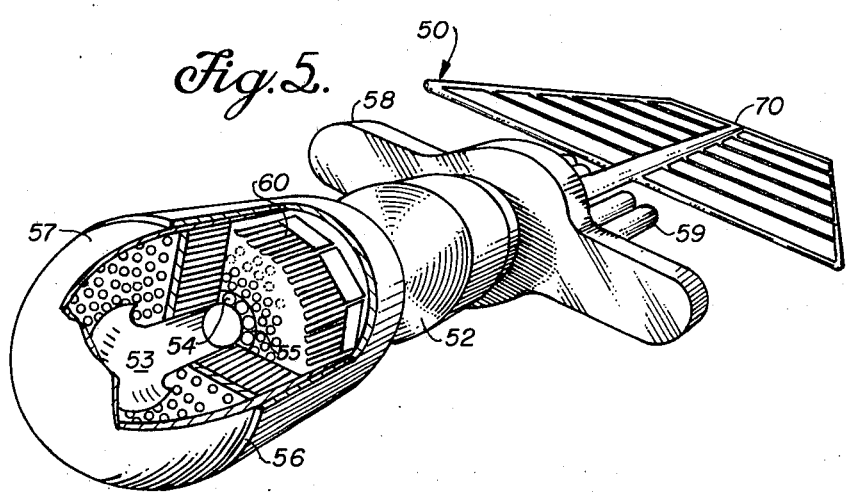
FIG. 5 is an illustration of a proposed 25-megawatt nuclear-electric space power plant.

For the embodiment of this invention set forth in the example and illustrated in FIG. 5, the initial lithium isotope components 19 and 20 inside and exterior to the fueled core are, respectively, 75% $Li^7$ and 25% $Li^6$, and 95% $Li^7$ and 5% $Li^6$; and the relative volumes are one to ten, respectviely.

Figure 3:
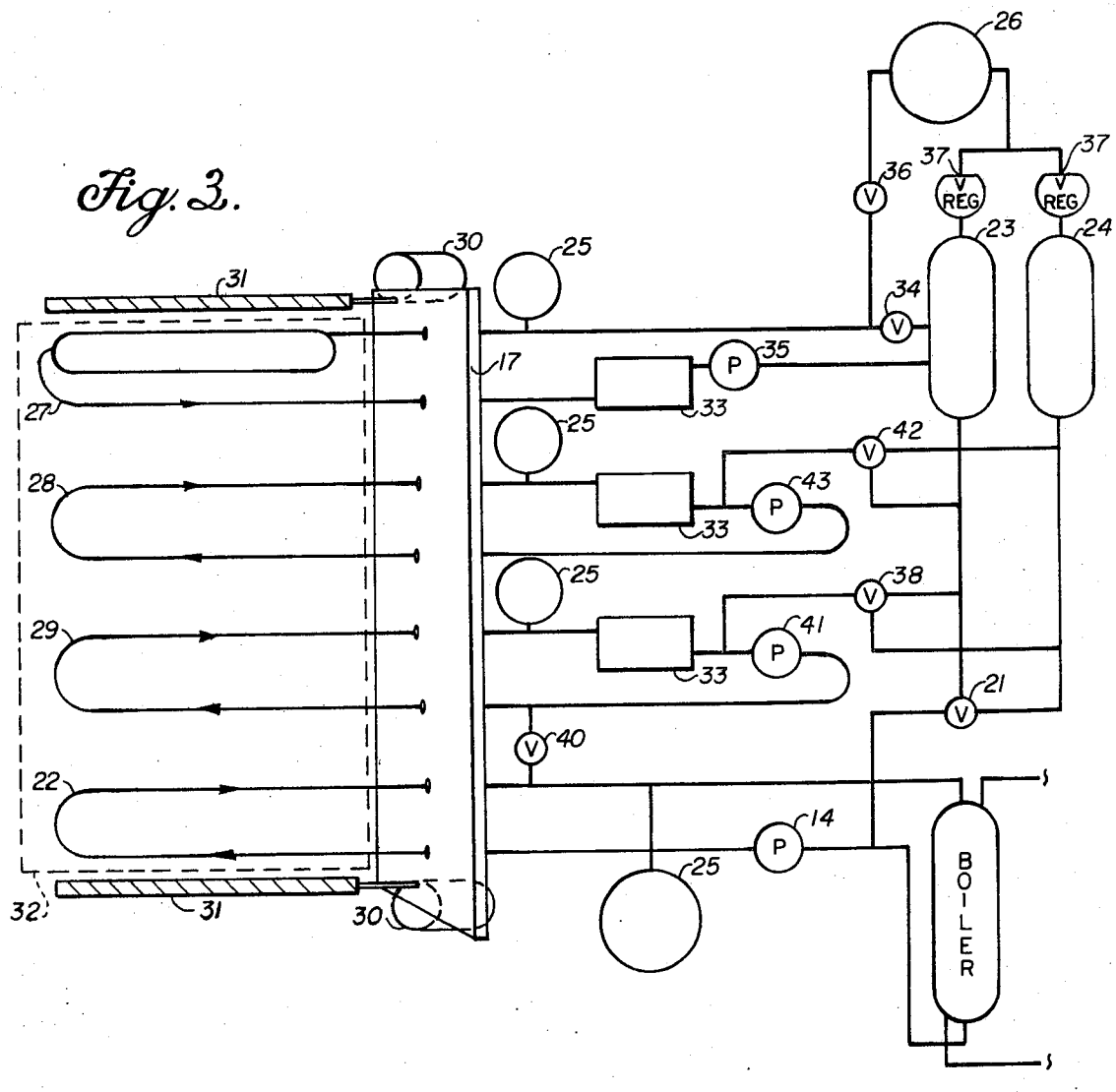
FIG. 3 is a schematic representation of a small, fast reactor system showing possible redundant liquid control functions using the invented techniques.

FIG. 3 shows a schematic of a preferred reactor cooling system which, in addition to the primary cooling loop 22 for accomplishing the tasks of providing ground safety and heat transfer from the reactor, includes secondary loops 27, 28 and 29 for providing shut-down or scram, heat-transfer from fuel to cladding and from cladding to coolant, and operational fine control functions, respectively. The volume of the secondary loops is considerably smaller than that of the primary heat transfer loop 22. Also, a mechanical back-up system 30 for controlling the reactor through movement of external neutron reflector barriers 31 is shown. All circulation loops are shown in relation to a representative core 32 and a heat and radiation shield 17. Auxiliary heat sinks 33 are used to remove excess heat collected by the circulating fluid in the secondary control circulation loops 26, 27 and 28. These may be radiators or heat exchangers communicating with the primary coolant loop.

Pumps 14, 35. 43 and 41 are respectively incorporated into the loops 22, 27, 28 and 29 for moving the coolant through core region 32. Also, each loop contains an expansion tank, numerals 25, to prevent loop rupture due to thermal expansion of the coolant and for accommodating the increase in coolant volume due to successive additions of components. Each loop is connected to reservoirs 23 and 24 which, respectively, contain the high and low absorption coolant components, for example $Li^6$ and $Li^7$. For use under gravity-free conditions, piston-cylinder type reservoirs, or diaphragm type reservoirs may be used.

The primary circulation loop 22 is connected to these reservoirs by way of three-way valving means 21. The isotopes $Li^6$ or $Li^7$ are added downstream from the expansion tank 25 and upstream from the pump 41, so that maximum mixing of the isotope in the primary coolant can occur prior to circulation through the core volume 32.

In the preferred embodiment, the shut-down or "scram" circulation loop 27 is used to decrease reactivity, i.e., to shut down the reactor system 11 by injection of $Li^6$ into and/or ejection of $Li^7$ from the fueled core volume 32. A plurality of the shut-down circulation loops 26 can be used, and $Li^6$ and $Li^7$ can be simultaneously injected or ejected from the core volume 32 in independent circuits, respectively, to give greater operational shut-down control without mixing of the isotopes. The pressurized helium in the tank 26 is used to drive the liquid lithium into or out of the shut-down circulation loops. More specifically, for injection of $Li^6$ into the core volume 32, a valve 34 is opened, letting $Li^6$ flow from the reservoir 23 into the core volume 32.

Alternatively, shut-down of the reactor system may be accomplished by maintaining a supply of $Li^7$ in the scram loop during reactor operation, and ejecting the $Li^7$ from the reactor volume to decrease reactivity. Specifically, in reference to the same loop 27, a valve 36 opens, establishing hydraulic communication between the helium tank and the loop 27, while the valve 34 closes, whereupon the liquid lithium in the loop is forced from the core.

The vernier-control fluid circulation loop 28 operates similar to the scram loop 27, or similar to the primary circulation loop 22. In the latter case, the isotope mixture ratio is constantly adjusted, using a three-way valving means 38 which communicates between the circulation loop 29 an dthe tanks 23 and 24. The principal purpose of the loop is fine adjustment of the reactivity level. Only small amounts of coolant fluid are required, which are circulated through the core. Valve 40 connects the vernier control loop 29 and the primary circulation loop 22 so that coolant can be exchanged between the vernier control loop and the primary circulation loop 22 to conserve pure $Li^6$ and $Li^7$ components.

For example, since the total volume of the vernier control loop 29 is a small fraction of the primary loop 22, the circulant fluid therein can be dumped into the primary loop 22 when its absorption cross section approaches an intolerable value. Conversely, the primary loop coolant fluid 22 can be used to dilute the isotope mixture ratio in the vernier control loop 29.

The coolant 47 (FIG. 4) in the stagnant-lithium circulation loop 28 is slowly circulated between fuel and cladding to thermally bond the fissile fuel to the cladding and primary coolant chanenls within the core volume. The use of such fluids for the purpose of sweeping gaseous fission products from the interstices between fuel and cladding and providing a good thermal bond between the fissile fuel rods and the primary circulation channels 22, and compensating for differential expansion of fuel and cladding, per se, is discussed extensively in U.S. Atomic Energy Commission Technical Reports Nos. UCRL–70272 and UCRL–70523. However, in the case of the present invention, by using the present coolant with its controllable neutronic properties as coupling fluid, the temperature reactivity effect can be effectively controlled by the coupling fluid also.

In more detail, the temperature reactivity effect is a reactivity effect caused by the thermal expansion of the materials making up the core of a reactor system. In small, fast reactor systems operating in a temperature range between 1000° C. and 2000° C., the thermal expansion and nuclear behavior of core components, in raising the temperature of the system from ambient ground temperature (approx. 20° C.) to the operational temperature of the system (approx. 1500° C.), causes differential thermal expansion of fissile fuel materials and cladding which forces the stagnant liquid 28 either into or out of the core volume, thereby changing the effective neutron multiplication of such systems. The adjustment of the neutron absorptivity of the coupling medium of the present case effectively compensates for the change of the multiplication factor due to the temperature change and fuel burn-up, as well as fully serving in the capacity of coupling fluids, as taught in the prior art.

Further, since the reactivity during mission life is adjusted by the thermal bonding fluid uniformly dispersed throughout the core, rather than with localized controls, e.g., side reflectors or control rods, the desired flat, spatial power density profile can be sustained during the mission.

Figure 4:
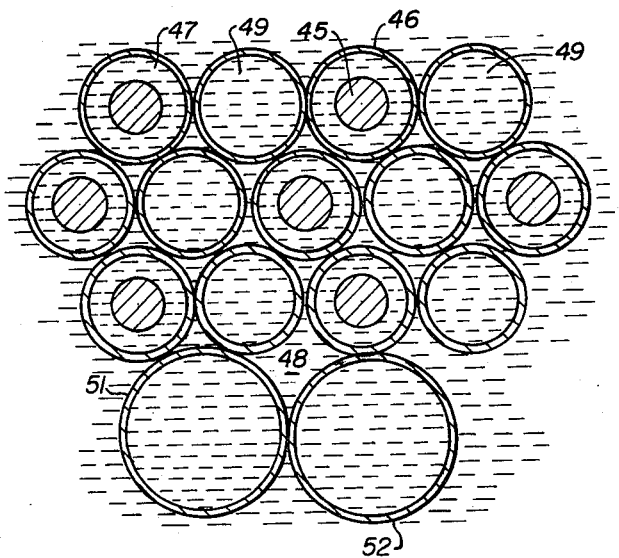
FIG. 4 is a cross sectional view of a core section of an exemplary space reactor.

With reference to FIGS. 3 and 4, the stagnant liquid loop 28 communicates through the core volume 32 via the annular regions between the fuel 45 and cladding 46 of the fuel rods, and via the voids and interstices 48 between the fuel rods 45 and the circulation channels 49. The liquid 47 is displaced from the core volume 32 into the expansion tank 25 of the stagnant liquid loop as the system is raised to the operating temperature. In the preferred embodiment, the stagnant liquid 47 is an isotopic mixture ratio of the lithium isotopes $Li^7$ and $Li^6$. The core volume 32 is initially filled during fabriction stages of the system with a particular mixture ratio of the lithium isotopes to give the system a desired initial temperature reactivity coefficient. By using different mixture ratios of the lithium isotopes, either a positive temperature reactivity coefficient or a negative temperature reactivity coefficient can be selected. For operational stability, slightly negative temperature coefficients are preferred. From the reference on reactor design cited above, suitable component ratios of the $Li^6$ and $Li^7$ isotopes applicable to given reactor designs can be readily determined. In essence, the density change of the stagnant liquid 47 and the displacement of the liquid from the core volume 32 due to differential thermal expansion of the fissile fuel 45 and the cladding 46 offsets reactivity changes caused by the geometric and Doppler temperature effects. The effect of the stagnant liquid is near-prompt (immediate) since the cladding 46 and the fissile fuel 45 are hydraulically coupled to the stagnant liquid 47.

Prior to the initial start-up of the reactor system, the stagnant liquid 47 is a solid, not requiring any mechanically active systems to keep it in situ in the core volume 32. At initial start-up of the reactor system, the stagnant liquid 47 liquifies and is slowly circulated in a circulation loop 28. The isotope mixture ratio can then be arbitrarily changed in the same manner as that in the priamry loop to compensate for time-dependent dynamic reactivity changes in the reactor system. For example, "swelling" of the fissile fuel due to fission gas collection in the fuel matrix will gradually displace the stagnant liquid 47 from the core volume. By adjusting the mixture ratio of the lithium isotopes making up the stagnant liquid 47, the reactivity effects caused by fuel burn-up can be automatically compensated by corresponding reactivity effects caused by commensurate displacement of the stagnant liquid from the core volume.

FIG. 4 shows the geometry of a typical reactor core in cross section, indicating the location of the various circulation loops with respect to the fueled core.

Fissile fuel rods 45 are encased in a high-temperature alloy cladding 46. The annular region between the fissile fuel rod 45 and the cladding 46 serves as the stagnant liquid loop 28 containing coolant 47. Similarly, the interstices 48 are also filled with coolant 47 of identical neutronic make up as the coolant between fuel and cladding. This coolant is also a part of the stagnant liquid loop 28. The primary circulation loop 22 occupies a plurality of tubular channels 49, located adjacent to the heat-generating fuel elements to conduct heat away therefrom. The vernier control system 29 occupies tubular channels 51, strategically disposed throughout the interior of the reactor core, to uniformly affect the reactivity thereof. The scram loop 27 utilizes channels 52 dimensionally identical to primary circulation channels 49, also located within the reactor interior. Since loss of fluids 39 and 44 from channels 51 and 52 could be detrimental to reactor operability in view of the high neutron absorption cross section of the material therein, the channels 51 and 52 are generally constructed of heavy or double-walled tubing. The combined cross sectional area of channels 51, 52 and interstices occupied by the stagnant liquid loop are generally less than 10% of the primary circulation loop.

The afore-described redundant control systems are described for small, fast nuclear reactor systems. They can be used either jointly or independently. They can also be used in conjunction with external neutron reflector control systems. However, using the afore-described redundant liquid control systems in conjunction with thin external neutron reflectors in a small, fast nuclear reactor will significantly improve the neutronic control dynamics of that system and the radial power-density profile.

FIG. 5 is a cutaway illustration of a proposed 60 Megawatt nuclear-electric space power plant 50 in accordance with the reactor system discussed in the example, from which the general details of the reactor core structure can be ascertained. Specifically, a primary coolant flows through the fissile fuel core 60 and returns to a boiler 52 through a central return duct 53. Liquid control circulation loops 54 are located in an annular region 55 between the central coolant return duct 53 and the fissile fuel core 60. Thin side reflectors 56 are disposed around the exterior surface of a pressure vessel 57 containing the core volume of the system. A radiation shield 58 is positioned between the core volume and the mechanically active componenst 59 of the system (pumps, valves and turbo alternators). A radiator 60 removed excess heat from the reactor system.

Example

A specific exemplary reactor structure incorporating the present invention is discussed in detail in papers presented at the Intersociety Energy Conversion Engineering Conference held at Miami Beach, Fla., on August 13–17, 1967, and published in U.S. Atomic Energy Commission Technical Report No. UCRL–70272. Other details of this space power system were presented at the Symposium on Fast Reactor Physics, Karlsruhe, Germany, available as U.S. Atomic Energy Commission Technical Report No. UCRL–70523.

Some of the characteristics of the proposed space reactor system shown in FIG. 5 are presented in the following tables:

TABLE I

Nuclear-electric space power (NESP) system characteristics

| | |
|---|---|
| Power, mwe. | 5 |
| Life, hours | 10,000 |
| Ssytem effiiciency | 0.20 |
| Overall turbine efficiency | 0.76 |
| Alternator efficiency | 0.93 |
| Reactor outlet temperature, ° K. | 1600 |
| Turbine inlet temperature, ° K. | 1450 |
| Turbine temperature ratio | 0.69 |
| High-temperature turbine speed, r.p.m. | 12,000 |
| Low-temperature turbine speed, r.p.m. | 18,000 |
| Reactor coolant | Lithium |
| Working fluid | Potassium |
| Radiator (heat pipe) fluid | Potassium |
| Reactor coolant pressure, bars | 6 |
| Working fluid pressure, bars | 15.6 |
| Radiator fluid pressure, bars | 0.6 |

TABLE II.—RANGE OF PARAMETERS OF FUELED CORE ANNULUS FOR NESP REACTOR

|  | Minimum | Nominal | Maximum |
|---|---|---|---|
| Burnup* | 0.004 | 0.008 | 0.012 |
| Volume fraction of flowing Li (primary loop) | 0.15 | 0.2 | 0.25 |
| Volume fraction of stagnant Li (stagnant loop) | 0.05 | 0.1 | 0.15 |
| Volume fraction of W structure | 0.1 | 0.2 | 0.3 |
| Volume fraction of void | 0 | 0.1 | 0.2 |
| Core length-to-diameter ratio L/D | 1.2 | 1.4 | 1.6 |

*BU=fuel burnup.

TABLE III.—SELECTED REACTIVITY EFFECTS OF THE 25 mwt. NESP SYSTEM

| Effect | Δk | | |
|---|---|---|---|
|  | BU=0.005 | BU=0.008 | BU=0.012 |
| $U^{235}$ depletion | −0.0058 | −0.0091 | −0.0115 |
| $U^{236}$ generation | +0.0001 | +0.0003 | +0.00050 |
| $U^{238}$ depletion | −0.0001 | −0.0002 | −0.0002 |
| $Pu^{239}$ generation | +0.0015 | +0.0014 | +0.0009 |
| Temperature | −0.0167 | −0.0204 | −0.0222 |
| Fuel swelling | −0.0005 | −0.0012 | −0.0021 |
| Operational shutdown | −0.0200 | −0.0200 | −0.0200 |
| Operational reserve | −0.0100 | −0.0100 | −0.0100 |
| Total adjustable reactivity required | 0.0515 | 0.0592 | 0.0646 |

While the invention is described with respect to representative and schematic embodiments, it will be apparent to those skilled in the art that numerous variations and modifications may be made within the spirit and scope of the invention, as set forth in the appended claims.

We claim:

1. A method for providing enhanced reactor safety during reactor shutdown and control of the reactivity level of nuclear reactor systems, comprising:
    (a) disposing, prior to start-up of said reactor, a first reactor coolant component which is miscible with the reactor coolant utilized for transfer of heat from said reactor core during the operation of said reactor, and which has a high neutron-absorption cross section which is a solid at the ambient temperature of said reactor prior to start-up, and which undergoes a change in phase when the reactor temperature is raised to operating temperatures, in a plurality of the cooling channels within the interior of the fissile core during the inoperative state of said reactor, all of the coolant existing in the core prior to start-up consisting of said high neutron cross section coolant component;
    (b) disposing a second reactor coolant component having a low neutron-absorption cross section, relative to said high neutron cross section coolant component, in a circulation loop exterior to the fissile core, said second reactor coolant component being miscible with said first component in the liquid state, all of the coolant exterior to the fissile core prior to start-up consisting of said low neutron cross section coolant component;
    (c) heating said high and low neutron-absorption cross section components to liquefy said components; and
    (d) circulating said high and low neutron-absorption cross section components to mix said components, thereby raising the reactivity level of said reactor.

2. The method of claim 1, further defined in that the mixture ratio of said high and low neutron-absorption cross section components circulating through said reactor is continuously adjusted by additions of selected quantities of one of said components to adjust the reactivity level of said system.

3. The process according to claim 1, wherein said components are selected from high and low neutron-absorption cross section materials of the group consisting of Li, Ag, Cu, Pb, Hg, K and Ba.

4. The process of claim 3, further defined in that said high and low neutron-absorption cross section materials are isotopes of the same element.

5. The process of claim 4, further defined in that said high neutron-absorption cross section isotope is $Li^6$, and said low neutron-absorption isotope is $Li^7$.

6. The method of claim 2, further defined in that the temperature reactivity coefficient of said nuclear reactor is adjusted by circulating a preselected mixture ratio of said high and low neutron-absorption cross section coolant components in the void spaces surrounding the fissile fuel material.

References Cited
UNITED STATES PATENTS

| 2,832,733 | 4/1958 | Szilard | 176—86 X M |
| 3,025,228 | 3/1962 | Whitelaw | 176—86 X G |
| 3,239,423 | 3/1966 | Cooper | 176—26 X |
| 2,917,444 | 12/1959 | Dreffin | 176—86 L |
| 3,310,473 | 3/1967 | Winsche | 176—22 X |
| 3,392,087 | 7/1968 | Braun et al. | 176—22 X |

OTHER REFERENCES

Transactions of A.N.S., vol. 10, No. 2, November 1967, by Hampel et al., pp. 420, 421.

CARL D. QUARFORTH, Primary Examiner

H. E. BEHREND, Assistant Examiner

U.S. Cl. X.R.

176—22